Sept. 29, 1964

G. L. STANSBARY 3,150,700

CUTTER FOR CITRUS PEEL HALVES

Filed Feb. 25, 1963

INVENTOR.
GLEN L. STANSBARY
BY
ATTORNEYS

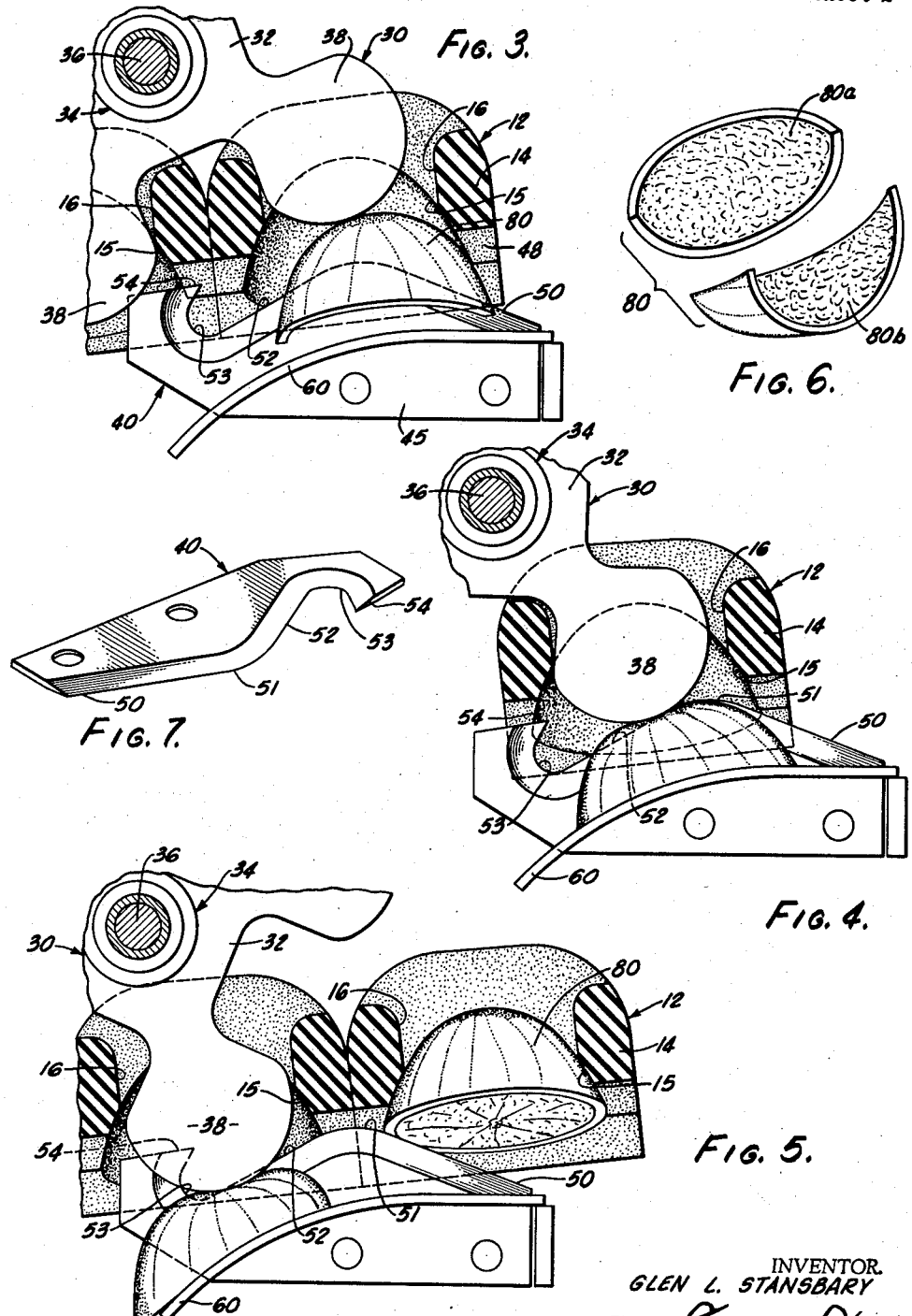

United States Patent Office 3,150,700
Patented Sept. 29, 1964

3,150,700
CUTTER FOR CITRUS PEEL HALVES
Glen L. Stansbary, Ontario, Calif., assignor to Brown Citrus Machinery Corporation, Whittier, Calif., a corporation of California
Filed Feb. 25, 1963, Ser. No. 260,415
11 Claims. (Cl. 146—3)

This invention relates to citrus juice extracting devices and has particular reference to improvements in citrus juice extracting machines.

A primary object of the present invention is to provide a citrus juice extracting machine having novel means for cutting the juice-depleting peel halves into two or more segments.

Recent advances in the citrus processing industry include the development of new apparatus for the extraction of oil from the peel of juice-depleted citrus peel, such apparatus being designed to operate at maximum efficiency upon segments of peel smaller than halves, preferably quarters. A further object of this invention is therefore to provide novel means incorporated in a citrus juice extracting machine, for quartering, or substantially quartering the juice-depleted peel halves produced by the extracting machine.

A further object of the present invention is to provide a novel and improved peel-quartering knife and peel ejector assembly adapted to be easily installed in existing juice extracting machines.

The copending application of Franklin K. Holbrook, Serial No. 90,829, filed February 21, 1961, discloses citrus juice extracting machines incorporating a peel-quartering knife or saw for the quartering, or substantial quartering of the citrus peel halves operated upon by the machine. While the apparatus disclosed in said copending application represents a substantial advance over the art and has been successfully used, it is subject to some disadvantages, particularly when used in machines operated at extremely high speeds and/or when not properly maintained in an extremely sharp condition. Accordingly, a further object of the present invention is to provide apparatus constituting an improvement over that of said copending application.

Other objects and advantages of this invention it is believed will be readily apparent from the following detailed description of a preferred embodiment thereof when read in connection with the accompanying drawings.

In the drawings:

FIGURES 3, 4 and 5 are each similar fragmentary diagrammatic views partly in section, illustrating sequential steps in the operation of the quartering means of the present invention.

FIGURE 6 is a perspective view illustrating a citrus peel half quartered by the apparatus of the present invention.

FIGURE 7 is a perspective view of the peel quartering knife.

Figure 1:
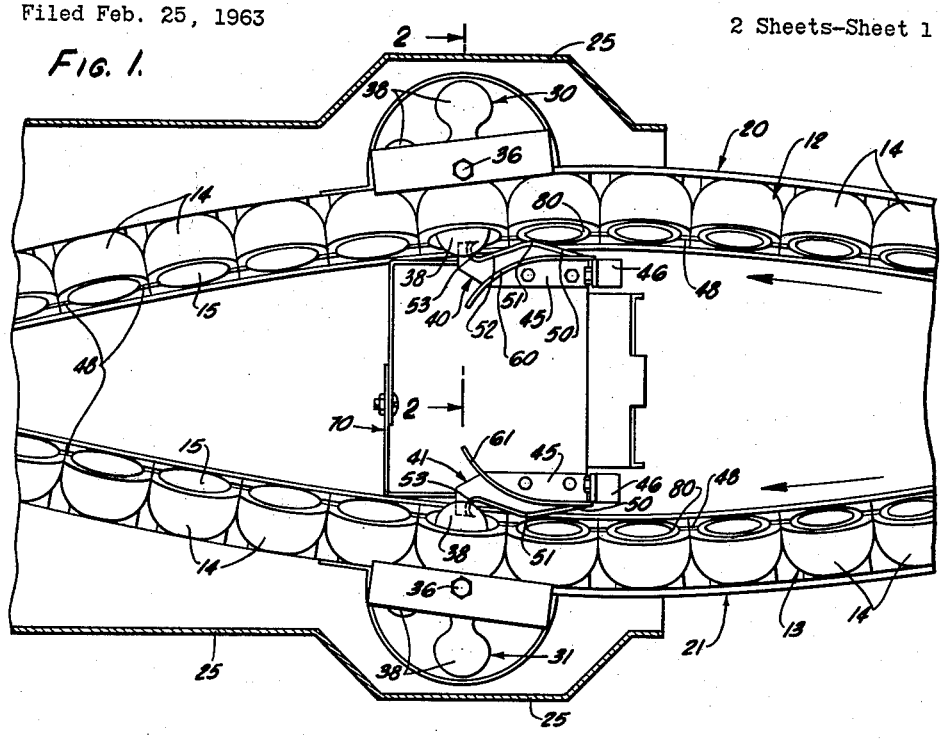
FIGURE 1 is a fragmentary plan view of a citrus juice extracting machine embodying the present invention.

Referring now to the drawings, the citrus juice extracting machine embodying the present invention is in general, with the exception of the improvements hereinafter described, substantially the same as that described in U.S. Patent No. 2,631,625 issued March 17, 1953 to Lloyd A. Wells, and comprises a frame 10 in which a pair of fruit or peel-half conveyors 12 and 13 are mounted. Each conveyor consists of a plurality of cups 14 pivotally connected together, each cup forming in substance a link of a completed chain-like conveyor. Each cup on the conveyor is complementary to a similar cup on the other conveyor and the two cups when brought together form a sphere for the purpose of holding or receiving generally spherical fruit such as oranges, grapefruit, lemons and the like. The cups are preferably formed of rubber or plastic and are provided with inner surfaces 15, preferably grooved to grip the fruit peels, and with a pair of generally parallel slots 16 and 17 extending through the cup from the back sides thereof.

The conveyors 12 and 13 converge at each end and diverge in the center, pivoted guides or tracks 20 and 21 being provided to define the paths of movement of the conveyors. The apparatus is provided at one end with means (not shown) for feeding whole fruit into the cups, and then cutting the fruit into halves, and with reamer means (not shown) at the other end for reaming the fruit halves to extract the juice therefrom. A sheet metal housing 25 encloses the operating parts of the apparatus.

In operation of the machine thus far described, which, as indicated above, is substantially the same as that disclosed in the above mentioned Wells patent, the upper runs of the conveyors 12 and 13 move in the direction of the arrows of FIGURE 1, each cup containing a juice-depleted fruit half which has just been reamed to remove its pulp and juice. Means are provided for ejecting the halves from the cups and as shown in the drawings, these means may include the pair of ejector wheels 30 and 31, one for each conveyor. Each wheel comprises a pair of plates 32 and 33 secured to a bushing assembly 34 freely rotatable on a shaft 36 suitably secured to a bracket 37 connected to the tracks 20 and 21. The plates are each provided with a plurality of curved paddle members 38 and 39 adapted to enter the respective slots 16 and 17 in the cups. The wheels 30 and 31 are caused to rotate by the movement of the conveyors 12 and 13, the paddles of each wheel being so shaped and spaced apart so that a pair of paddles 38 and 39 are always within and contacting the respective slots 16 and 17.

Means are provided for cutting the peel halves as they are ejected from the cups and as shown in the drawings these means may include a pair of knives 40 and 41, one mounted inwardly of and adjacent each of the conveyors 12 and 13. Each knife is bolted to a bracket member 45 which is secured to a post member 46, one carried on each of the tracks 20 and 21. The knives are preferably provided with curved, bevelled cutting edges extending into a slot 48 in the cup edges. The particular shape of the knife cutting edge constitutes an important feature of the present invention. As shown in the drawings, the portion 50 of the cutting edge first in the path of travel of the peel halves carried by the respective conveyor 12, 13 is inclined at an angle rearwardly and toward said path of travel such that the central portion 51 of the cutting edge extends into the slot 48 a greater distance than the portion 50, the portion 51 merging into an intermediate cutting edge portion 52, which is inclined rearwardly and away from the path of travel of the conveyor. The most rearward or trailing portion of the knife cutting edge is formed as a continuation of the portion 52 and comprises a generally hook-shaped cutting edge portion 53, the end 54 of which extends into the slot 48 substantially the same distance as the central portion 51. Thus, the cutting edge of the knife 40 is generally S-shaped.

The spacing of the knives with respect to the paddles of the ejector wheel is quite critical, the knives being positioned so that the hook portions 53 thereof lie inside the peripheral arc of rotation of the paddles and just forwardly (with respect to the direction of conveyor travel) of the portion of that arc which lies closest to the longitudinal center line of the machine, the plane of each knife being parallel to and lying between the planes of the respective paddles 38 and 39.

Figure 2:
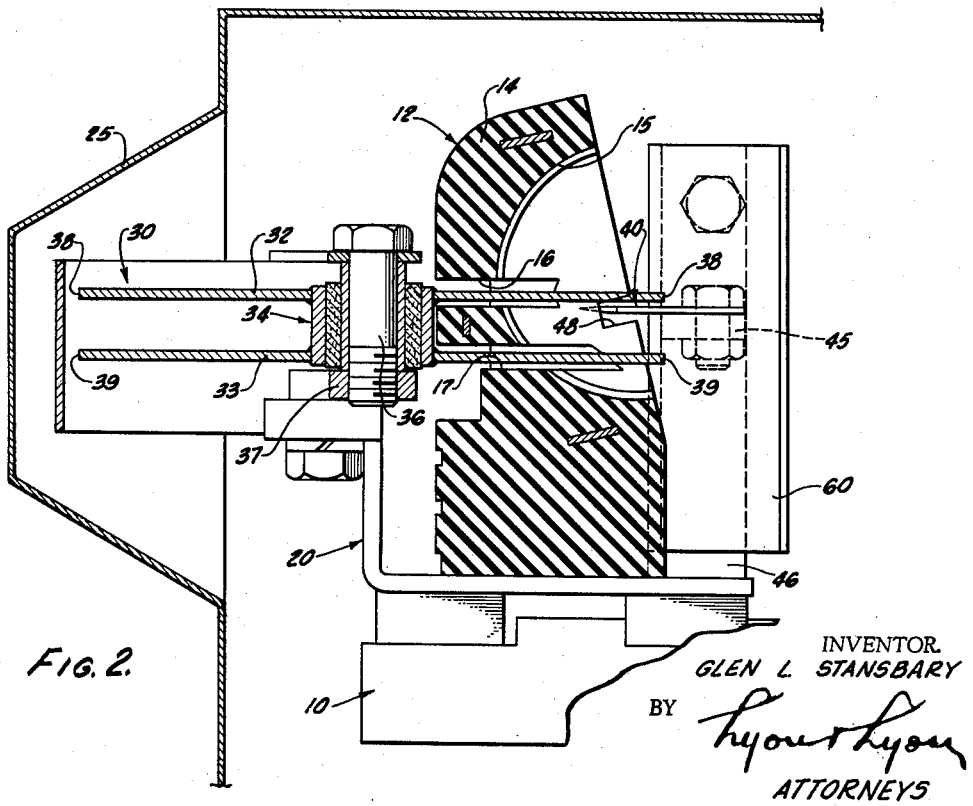
FIGURE 2 is a sectional elevation taken substantially on the line 2—2 of FIGURE 1.

Guide means are provided for guiding the fruit peel as it is being operated upon by the paddles and the knives and as shown in the drawings, these means comprise a pair of curved, back-up plates 60 and 61 extending from each side of the respective knives 40 and 41 and generally perpendicular thereto, the forward portions of the back-up plates being generally parallel to the respective tracks 20 and 21, the plates curving rearwardly and inwardly away from the tracks, first following the general contour of the knife edge portions 52, and then the most rearward portions of the back-up plates extending beyond the surfaces of the knives as shown best in FIGURES 1 and 2.

A chute 70 is positioned between the conveyors opposite the ejector wheels for the reception of the peel segments as they are ejected from the cups.

In operation, the ejector wheels are driven by the cups as they pass the ejector, the paddles moving through the slots 16 and 17 to push the peel halves 80 outwardly of the cups. This portion of the operation is best shown in the diagrammatic views of FIGURES 3 and 5. Thus, as the peel half is moved outwardly from the cup by the paddles, it contacts the stationary knife and is bisected thereby into segments 80a and 80b as the continued outward thrust of the paddles causes the peel half to be wiped across the knife and into contact with the back-up plate 60, until the peel half is completely cut into substantially two quarters. These are not true quarters, but only approximations thereof, due to the slight angular position of the peel half as it is being cut, as is apparent from FIGURE 6. The peel quarters fall into and through the chute, from which they are collected for the subsequent oil removal operation.

From the above description, and considering again FIGURES 3 through 5, it will be understood that the relationship and cooperation between the paddles 38 and knives, particularly the hook portions 53 thereof, together with the back-up plates 60, produce a positive cutting or severing action which assures complete severing into the two quarters or segments regardless of the speed of operation of the machine, size of fruit and without the necessity for extreme sharpness of the cutting edge. Thus, the apparatus of the present invention has permitted operation under conditions heretofore not possible, even with use of the apparatus of said copending Holbrook application. In the juice extracting apparatus of the type shown, as the speed of travel of the conveyors increases, the speed with which the peel halves are ejected from the cups is correspondingly increased to a point where the peel half following the peel half being cut tends to move into close proximity, and in some cases, actual contact, with the latter peel half. In the apparatus of the copending application, this could result in incomplete cutting of one or both of the halves and/or jamming of the halves to a point where they are discharged beyond the hopper 70 into the juice-collecting area of the apparatus. Such is not the case with the present apparatus, due in large part to the specific shape of the knife cutting edges and their cooperation with the paddles and back-up plates. The hook portions 53 not only provide cutting edges which intersect the path of travel of the peel being cut, but the pocket or void formed by the hook-like configuration reduces the frictional area of contact between the knife and peel surfaces, thus permitting the peel to accelerate across this portion of the knife so as to be out of the way of the succeeding peel being cut.

Having fully described my invention, it is to be understood that I do not wish to be limited to the details set forth herein but my invention is of the full scope of the appended claims.

I claim:

1. In combination with citrus juice extracting machines of the type including a conveyor composed of a plurality of slotted cups and adapted to contain a fruit peel half, and an ejector paddle moveable in a path to enter said cups to eject the peel halves therefrom; a knife mounted adjacent the path of travel of said conveyor and positioned to cut the peel halves as they are ejected from the cups, said knife having a cutting edge, a portion of said cutting edge being hook-shaped and extending into overlapping relation with the path of said paddle.

2. In combination with citrus juice extracting machines of the type including a conveyor composed of a plurality of slotted cups and adapted to contain a fruit peel half, and an ejector wheel having rotating paddles adapted to enter said cups to eject the peel halves therefrom; a stationary knife mounted adjacent the path of travel of said conveyor and positioned adjacent the rotational arc of said paddles to cut the peel halves as they are ejected from the cups, said knife having a cutting edge, a portion of said cutting edge being hook-shaped and extending into overlapping relation with respect to the plane defined by said rotational arc.

3. The combination of claim 2 wherein each cup is provided with a pair of parallel, spaced slots, wherein said wheel has a plurality of pairs of spaced, parallel paddles and wherein the plane of the knife cutting edge is parallel to and lies between the plane of said pairs of paddles.

4. In a citrus juice extracting machine, a frame, a conveyor on said frame carrying a plurality of slotted cups, each cup adapted to contain a fruit peel half, means mounted on said frame and insertable through said slots to eject fruit peel halves contained in said cups, and a knife mounted on said frame and operably associated with said cups and said means to cut peel halves as they are ejected from the cups by said means, said knife having a cutting edge, a portion of said cutting edge being hook-shaped.

5. In combination with citrus juice extracting machines of the type including a conveyor composed of a plurality of slotted cups and adapted to contain a fruit peel half, and an ejector paddle moveable in a path to enter said cups to eject the peel halves therefrom; a knife mounted adjacent the path of travel of said conveyor and positioned to cut the peel halves as they are ejected from the cups, said knife having a cutting edge, a portion of said cutting edge being hook-shaped and extending into overlapping relation with the path of said paddle, and a back-up plate extending from each side of said knife and generally perpendicular thereto, said plate being spaced outwardly from the end of the path of said paddle.

6. In combination with citrus juice extracting machines of the type including a conveyor composed of a plurality of slotted cups and adapted to contain a fruit peel half, and an ejector wheel having rotating paddles adapted to enter said cups to eject the peel halves therefrom; a stationary knife mounted adjacent the path of travel of said conveyor and positioned adjacent the rotational arc of said paddles to cut the peel halves as they are ejected from the cups, said knife having a cutting edge, a portion of said cutting edge being hook-shaped and extending into overlapping relation with respect to the plane defined by said rotational arc, and a back-up plate extending from each side of said knife and generally perpendicular thereto, said plate being spaced outwardly from said rotational arc a distance less than the radius of the fruit being cut.

7. The combination of claim 6 wherein each cup is provided with a pair of parallel, spaced slots, wherein said wheel has a plurality of pairs of spaced, parallel paddles and wherein the plane of the knife cutting edge is parallel to and lies between the plane of said pairs of paddles.

8. The apparatus of claim 1, wherein an intermediate portion of the cutting edge is inclined rearwardly and away from the path of travel of said conveyor, said portion merging into said hook-shaped portion.

9. The apparatus of claim 1, wherein the portion of the cutting edge first in the path of travel of the peel halves is inclined rearwardly at an angle toward said path of travel, the central portion of said cutting edge curving from said first-named portion into an intermediate portion of said cutting edge, said intermediate portion inclined rearwardly and away from the path of travel of said conveyor and merging into said hook-shaped portion.

10. The apparatus of claim 6, wherein the portion of the cutting edge first in the path of travel of the peel halves is inclined rearwardly at an angle toward said path of travel, the central portion of said cutting edge curving from said first-named portion into an intermediate portion of said cutting edge, said intermediate portion inclined rearwardly and away from the path of travel of said conveyor and merging into said hook-shaped portion.

11. The apparatus of claim 10, wherein said plate is curved rearwardly and away from the path of travel of said conveyor.

References Cited in the file of this patent
UNITED STATES PATENTS

| | | |
|---|---|---|
| 2,631,625 | Wells | Mar. 17, 1953 |
| 2,848,025 | Harden et al. | Aug. 19, 1958 |